United States Patent
Berger et al.

(10) Patent No.: US 8,047,302 B2
(45) Date of Patent: Nov. 1, 2011

(54) DRILLING AND/OR STRIKING HAMMER WITH A LUBRICATING DEVICE

(75) Inventors: Rudolf Berger, Grünwald (DE); Otto Stenzel, Herrsching (DE)

(73) Assignee: Wacker Neuson Produktion GmbH & Co. KG, Munich (DE)

( * ) Notice: Subject to any disclaimer, the term of this patent is extended or adjusted under 35 U.S.C. 154(b) by 191 days.

(21) Appl. No.: 12/489,753

(22) Filed: Jun. 23, 2009

(65) Prior Publication Data

US 2009/0277657 A1    Nov. 12, 2009

Related U.S. Application Data

(63) Continuation-in-part of application No. 10/499,567, filed as application No. PCT/EP02/14065 on Dec. 11, 2002, now abandoned.

(30) Foreign Application Priority Data

Dec. 21, 2001   (DE) .................................. 101 63 278

(51) Int. Cl.
  *B25D 17/26*  (2006.01)
  *B25D 17/24*  (2006.01)
(52) U.S. Cl. .................... 173/1; 173/3; 173/20; 173/46; 173/77; 173/162.1; 173/162.2; 184/6.5; 184/6.8; 184/6.14; 184/105.2
(58) Field of Classification Search .............. 173/46, 173/77, 3, 20, 162.1, 162.2, 1; 184/41, 45.1, 184/105.1, 105.2, 6.5, 6.14, 6.8
See application file for complete search history.

(56) References Cited

U.S. PATENT DOCUMENTS

| | | | | |
|---|---|---|---|---|
| 2,134,735 A | * | 11/1938 | Reinhold | 222/262 |
| 2,605,787 A | * | 8/1952 | Kiekhaefer | 30/123.4 |
| 2,650,626 A | * | 9/1953 | Kiekhaefer | 30/123.4 |
| 3,376,939 A | | 4/1968 | Holzapfel | |
| 3,525,373 A | * | 8/1970 | Kobayashi | 30/381 |
| 3,822,001 A | | 7/1974 | Sides | |
| 3,966,019 A | | 6/1976 | Heikkila et al. | |
| 4,183,414 A | | 1/1980 | Tamai et al. | |
| 4,483,072 A | * | 11/1984 | Nagashima et al. | 30/381 |
| 4,673,043 A | * | 6/1987 | Greppmair | 173/162.2 |
| 4,699,250 A | | 10/1987 | Hiestand | |
| 4,813,139 A | * | 3/1989 | Nagashima | 30/123.4 |
| 5,000,128 A | | 3/1991 | Veldman | |

(Continued)

FOREIGN PATENT DOCUMENTS

| | | |
|---|---|---|
| DE | 1208234 B | 12/1965 |
| DE | 2222062 A | 11/1973 |
| DE | 2654616 A | 7/1978 |
| DE | 2804665 A | 8/1978 |
| DE | 19805187 A | 8/1999 |
| EP | 0297064 A | 12/1988 |
| GB | 2210473 A | 6/1989 |
| JP | 57066881 A | 4/1982 |

*Primary Examiner* — Rinaldi I. Rada
*Assistant Examiner* — Michelle Lopez
(74) *Attorney, Agent, or Firm* — Boyle Fredrickson, S.C.

(57) ABSTRACT

Disclosed is a drilling and/or striking hammer that includes a lubricating device having a lubricant reservoir and a volume of lubricant contained therein. The lubricating device conveys lubricant to at least one a transmission system within the hammer's housing, a percussion system, and/or a tool holder at a variable dosing or flow rate. The dosing or flow rate varies as a function of tool stress which can include use intensity and/or temperature. A flexible tube extends between the reservoir and the lubricated component(s). At lease part of the flexible tube vibrates with the lubricated components during use and modifies a viscosity of the lubricant therein, based on tool use intensity. A pressure generating device can pressurize the lubricant, helping convey the lubricant to a targeted area for lubricating movable parts.

24 Claims, 6 Drawing Sheets

U.S. PATENT DOCUMENTS

| | | |
|---|---|---|
| 5,060,761 A | 10/1991 | Arndt et al. |
| 5,589,059 A | 12/1996 | Semar |
| 5,598,902 A | 2/1997 | Lin |
| 5,732,794 A | 3/1998 | Orlitzky |
| 5,890,849 A | 4/1999 | Cselle |
| 6,109,366 A | 8/2000 | Jansson et al. |
| 6,145,625 A | 11/2000 | Prokop et al. |
| 6,286,610 B1 * | 9/2001 | Berger et al. ............... 173/162.1 |
| 6,776,245 B2 * | 8/2004 | Kristen et al. ................ 173/217 |
| 6,929,098 B2 | 8/2005 | Ilmarinen et al. |
| 7,000,734 B2 | 2/2006 | Nawamoto et al. |
| 7,527,107 B2 * | 5/2009 | Berger et al. ............... 173/162.2 |
| 2008/0190632 A1 * | 8/2008 | Berger et al. ............... 173/162.2 |

\* cited by examiner

DRILLING AND/OR STRIKING HAMMER WITH A LUBRICATING DEVICE

CROSS REFERENCE TO RELATED APPLICATIONS

This application is a continuation-in-part of and claims the benefit of the filing date of co-pending U.S. patent application Ser. No. 10/499,567, filed on Jun. 21, 2004 and entitled Drilling and/or Striking Hammer with a Lubricating Device, the entirety of which is expressly incorporated by reference herein for all purposes.

BACKGROUND OF THE INVENTION

1. Field of the Invention

The present invention relates to drilling and/or striking hammers having lubricating devices.

2. Description of the Related Art

In drilling and/or striking hammers, designated as hammers below, it is known that various moving parts of the hammers require lubrication. For example, hammers have a transmission that transmits power from a drive motor to a percussion system and that has numerous bearings and toothed gears that require lubrication. Components of the hammer's percussion system also require lubrication. As an example, the typical hammer has a tool shank that is housed in a tool holder that is impacted by a reciprocating striker in use. The upper of the tool shank requires lubrication during use.

It is also known that housings of such lubrication-requiring components are typically not fully sealed units that can hold and maintain a volume of lubricant indefinitely. Instead, the hammer consumes lubricant during use as small quantities of lubricant leak from the transmission, percussion system, and/or the tool holder. The lubricant must be periodically replenished to maintain adequate lubrication of system components.

At any given time, the amount of lubricant in a hammer is not readily visually or otherwise discernable. Accordingly, lubricant replenishing is usually performed according to a maintenance schedule that provides recommended service intervals as functions of tool use periods. As an example of a recommended service interval, lubricant replenishing or refilling is typically performed after each twenty operational hour interval. Such twenty hour operational interval is an average time, following a lubricant refill, that a hammer will consume enough lubricant to leave only a minimum volume of lubricant to suitably lubricate the hammer.

Rates of lubricant consumption can vary dramatically as functions of, for example, temperatures of the transmission system, percussion system, and/or tool holder. This is because many lubricants, particularly grease, become progressively less viscous as their temperatures rise and leak from the hammer at a higher rate. Transmission system, percussion system, and/or tool holder temperatures can be influenced by both tool use intensity and ambient temperature. Hence, low intensity tool use and/or low ambient temperatures can lead to relatively low rates of lubricant consumption, while high intensity tool use alone or in combination with high ambient temperatures can lead to particularly high rates of lubricant consumption. The recommended maintenance schedule for refilling the lubricant of most hammers is based on average consumption rates. A user therefore may refill the lubricant more frequently than is actually required if a hammer consumes lubricant at a particular low consumption rate. Stopping use of a hammer to refill lubricant more frequently than is required can lead to lower production efficiency of the tool. Conversely, if a hammer consumes lubricant at a particular high rate, then a user may refill the lubricant less frequently than is actually required. This can lead to rapid wear of hammer components and premature failure.

In addition to running out of lubricant, a lubricant starved condition can be momentarily imposed on a hammer due to its lubrication system's configuration. This can occur, for example, if lubricant dispensing takes place randomly and/or if dispensing is position dependent or influenced. Exemplary of a drilling and/or striking hammer of this sort can be seen in a German Patent No. DE 39 36 849 A1. There, in a cover a depression is formed in which a high-viscosity grease is contained that can gradually flow through a dosing opening into a glide bearing between a crank bolt and a connecting rod. The dispensing of the lubricant takes place randomly, and is possible only when the hammer is in a suitable position, because gravitational support is required.

In European Patent Application No. EP 0 861 997 B1, a hand tool having a lubricated angular gear is described. There, a reservoir of lubricant is provided in the form of a pot that is open at the top, through which there passes a rotating spindle shaft. In the pot, a metal ball can move in such a way that due to the housing vibrations it tumbles through the lubricant, which is likewise located in the pot. In the base of the pot, a dosing opening is provided through which lubricant is occasionally pressed downwards due to the random motion of the metal ball; in this way, the lubricant reaches a ball gear for lubrication. Here as well, the lubrication takes place randomly and cannot take place independent of position.

OBJECTS AND SUMMARY OF THE INVENTION

The present invention is based on the object of indicating a drilling and/or striking hammer in which a lubricant can be supplied reliably, independent of position, and independent of random influences.

Another object of the invention is to provide a hammer lubrication system that automatically varies a dosing or flow rate of the lubricant as a function of tool stress. Tool stress can include tool use intensity and/or operating temperature.

In one specific family of embodiments, the hammer includes a percussion mechanism and a housing which encloses a gear mechanism that drives the percussion mechanism. A pair of handles extends from a hood that covers the housing. A vibration damping system can be provided in a void space between the hood and housing, joining the hood and housing together in a manner that allows them to move with respect to each other. A lubricating device can be implemented for lubricating at least one of the percussion mechanism and gear mechanism. A reservoir of the lubricating device is mounted to the hood, and a flexible tube extends between the reservoir and the housing. The flexible tube directs lubricant from the reservoir to the housing and flexes to accommodate changes in the distances between the hood and housing. For example, the flexible tube can absorb vibrations generated in or otherwise transmitted from the housing, preventing or reducing the amount of such vibrations that are transmitted from the housing to the reservoir.

Furthermore, since at least part of the flexible tube vibrates in unison with the housing, the vibration or movement of the flexible tube imposes a stirring effect on the lubricant within that portion. Stated another way, the vibration or movement of the flexible tube subjects the lubricant therein to shear stresses which reduce viscosity of the lubricant modifying individual lubricant particles or constituents so that they glide past each other relatively easier. In this way, as tool use intensity increases, so too does the frequency and/or amplitude of the flexible tube vibrations or movements. This increased movement correspondingly imposes increased shear stresses to the lubricant in the flexible tube, lowering its viscosity and making it flow faster. In other words, as tool use intensity increases, a dosing or flow rate of the lubricant is correspondingly increased to accommodate the hammer's increased lubrication needs. The converse can also be true, whereby the lubricant viscosity is reduced to a lesser extent when the tool use intensity decreases, reducing the lubricant dosing or flow rate.

The flexible tube may be non-linear in order to increase its effective length. In such configuration, the flexible tube has a bend which can be, for example, a U-shaped bend, that contorts dynamically as the housing moves with respect to the hood.

The flexible tube may be a rubber hose attached to the housing by way of a nozzle and can be greater then 10 mm long and have an inner diameter of less than 5 mm. A grease fitting can be provided for selectively refilling the reservoir from outside of the hood with a grease gun or other suitable tool, without requiring hood removal.

The reservoir may be pressurized to a driving force value which is above an ambient pressure. In such configurations, the lubricating device may have a variable flow resistance that varies as a function of tool stress arising, for example, from use intensity or temperature. The lubricating device can define (i) a resting state in which a flow resistance value is greater than the driving pressure value such that the lubricant is static or does not flow within the lubricating device, and (ii) an in-use state in which the flow resistance value is less than the driving pressure value such that the lubricant flows from the reservoir to components requiring lubrication such as the housing, gear mechanism, and/or percussion mechanism. The lubricating device can automatically and dynamically change from the resting state to the in-use state when the hammer is activated or operated.

In some embodiments, the handheld drilling and/or striking hammer may have a dosing device in which has, on the one hand, a dosing opening that brings a supply of lubricant into communication with a point to be lubricated, and on the other hand a conveying device is provided that conveys the lubricant from the lubricant supply through the dosing opening to the point to be lubricated. The conveying device is fashioned in such a way that, using it, the lubricant can be conveyed from the lubricant supply through the dosing opening to the point to be lubricated on the basis of a controlled or predetermined path displacement effect or dynamic effect. Whereas the lubricating devices known from the prior art enable a merely random lubricating effect, which in addition require the hammer to be in a particular position in order for lubricant to be able to reach the point to be lubricated, the conveying mechanism according to the present invention ensures a lubrication that can be predetermined and calculated, as well as being independent of position.

If the conveying mechanism conveys lubricant based on a path effect, it typically has a suitable conveying element, e.g. a conveying coil that can be situated in the dosing opening in order to convey the lubricant through the dosing opening.

A controlled path or gravitational effect enables lubrication suited to the needs of the situation, and can for example be achieved in that the stress on the hammer or on individual components, and the need for lubrication resulting therefrom, is determined by a stress acquisition mechanism (explained below) that supplies the determined information to a suitable control unit. The control unit then controls the path or force effect of the conveying mechanism.

Alternatively, the path or force effect can also be predetermined by a suitable design of the conveying mechanism. This is for example possible in that during the operation of the hammer a flow of lubricant is realized that is continuous or is intermittent, and is constant over time. The conveying of lubricant is then independent of stress. However, it can be predetermined in such a way that sufficient lubrication is ensured in all operating states.

In another specific embodiment of the present invention, the conveying mechanism produces a combined path and force effect in order to convey the lubricant. For this purpose, the conveying mechanism has a pressure-producing mechanism with which the lubricant supply can at least at times be placed under increased pressure. Due to the fact that the supply of lubricant can be placed under pressure, a controlled driving of the lubricant out of the lubricant reservoir through the dosing opening to the point to be lubricated can be realized.

The lubricant supply can be placed under a degree of pressure that is higher than that of the environment surrounding the point to be lubricated. In this way, it is ensured that even when there are pressure fluctuations in the area of the point to be lubricated, as is the case for example in the crank chamber housing the crankshaft or in the area of the percussion mechanism of the hammer, there exists a difference in pressure between the lubricant in the lubricant reservoir and the area surrounding the point to be lubricated, so that lubricant can reliably be conveyed to the point to be lubricated. The lubricant can then be conveyed from the area surrounding the point to be lubricated to the actual point to be lubricated (for example, to a bearing point for the crankshaft or to a sliding surface between moving pistons in the percussion mechanism) without additional effort.

In some embodiments, of the present invention, the pressure-producing mechanism comprises a spring device and/or an actuating element. The spring device or the actuating element can act on the lubricant supply directly or also via a movable separating element, such as a membrane or a piston. The spring device can thereby comprise any type of spring, in particular a gas spring or a helical spring, or also a plurality of springs.

In another embodiment of the present invention, as a pressure-producing device a helical spring made of what is known as a "memory" material is used in which the actual spring force is not exerted until a particular temperature has been reached. In this way, for example pressure can be produced on the lubricant supply, resulting in a dispensing of lubricant, only when the hammer has reached a particular operating temperature that is higher than room temperature, and the memory spring has been correspondingly heated. In this way, an expensive control or regulation mechanism becomes superfluous.

If, in place of the spring device, an actuating element is used, a control unit can be provided that drives an actuating element according to the particular case of application.

In yet another embodiment of the present invention, the lubricant receptacle is fastened in exchangeable fashion on or in a housing of the hammer. In this way, the lubricant receptacle can be provided in the form of an exchangeable cartridge that can be exchanged by the operator at predetermined time intervals or in response to a corresponding signal. In this way, it is possible to avoid a difficult, dirty filling of the lubricant reservoir, for example using a grease gun, which may not be available at the site of use of the hammer.

In some embodiments of the present invention, a valve device is provided in the dosing opening, which opening can also be realized in the form of a dosing duct; using this valve, the dosing opening can be opened, and can be closed at least in one direction of flow. Thus, for example, a check valve can be used in the dosing opening that prevents contaminated or used lubricant from flowing back into the lubricant reservoir.

If the valve device can be controlled via a valve control unit, it is even possible to deliberately control a delivery of the lubricant dependent on the state of the lubricant or other operating states. For this purpose, it is particularly advantageous if the supply of lubricant is permanently placed under pressure by the pressure-producing mechanism during the operation of the hammer. The delivery of the lubricant can then be controlled merely by controlling the valve device.

In further embodiments, a stress acquisition mechanism is provided with which a current and/or long-term stress on the hammer can be determined. As a criterion for the current amount of stress on the hammer, a temperature inside the hammer housing, a lubricant temperature, or also a vibration amplitude can be acquired. As a criterion for long-term degree of stress, suitable criteria include for example the operation time since the last maintenance, a cumulative current or power consumption over the operating time, or also a total number of rotations of a drive of the hammer since the last maintenance.

If necessary, the stress-acquisition mechanism has a sensor or counting device for the acquisition of a suitable criterion.

In another embodiment, a stress signal produced by the stress-acquisition mechanism can be supplied to an evaluation mechanism that correspondingly drives the valve control device in order to open or close the valve that seals the dosing opening, or to interrupt a supply of power to the drive of the hammer. Alternatively, the evaluation mechanism can also drive the control unit of the actuating element. In this way, the stress signal, based on the suitable criterion, can be used for the automatic controlling of the delivery of the lubricant.

In yet another embodiment, the stress signal is supplied to a display mechanism that informs the operator of the state of stress or of the fact that maintenance is needed via an optical or acoustic signal. Such an inspection display makes it possible for the operator to recognize ahead of time whether the hammer needs to undergo extensive maintenance, or whether for example the lubricant reservoir merely needs to be filled with lubricant. On the basis of the different stress criteria, here it is possible to provide the operator with differentiated information.

In order to ensure a constant delivery of lubricant to the point or points inside a hammer that are to be provided with lubricant, it is particularly useful if used or contaminated lubricant can be removed from the interior of a hammer housing, for example from the crank chamber or away from the area of a percussion mechanism. This is possible via an area of a machine housing that brings the point to be lubricated into communicating connection with the surrounding environment.

These features, and additional features and advantages of the present invention, are explained in more detail below on the basis of examples, with the aid of the accompanying Figures.

DETAILED DESCRIPTION OF THE PREFERRED EMBODIMENTS

Figure 1:
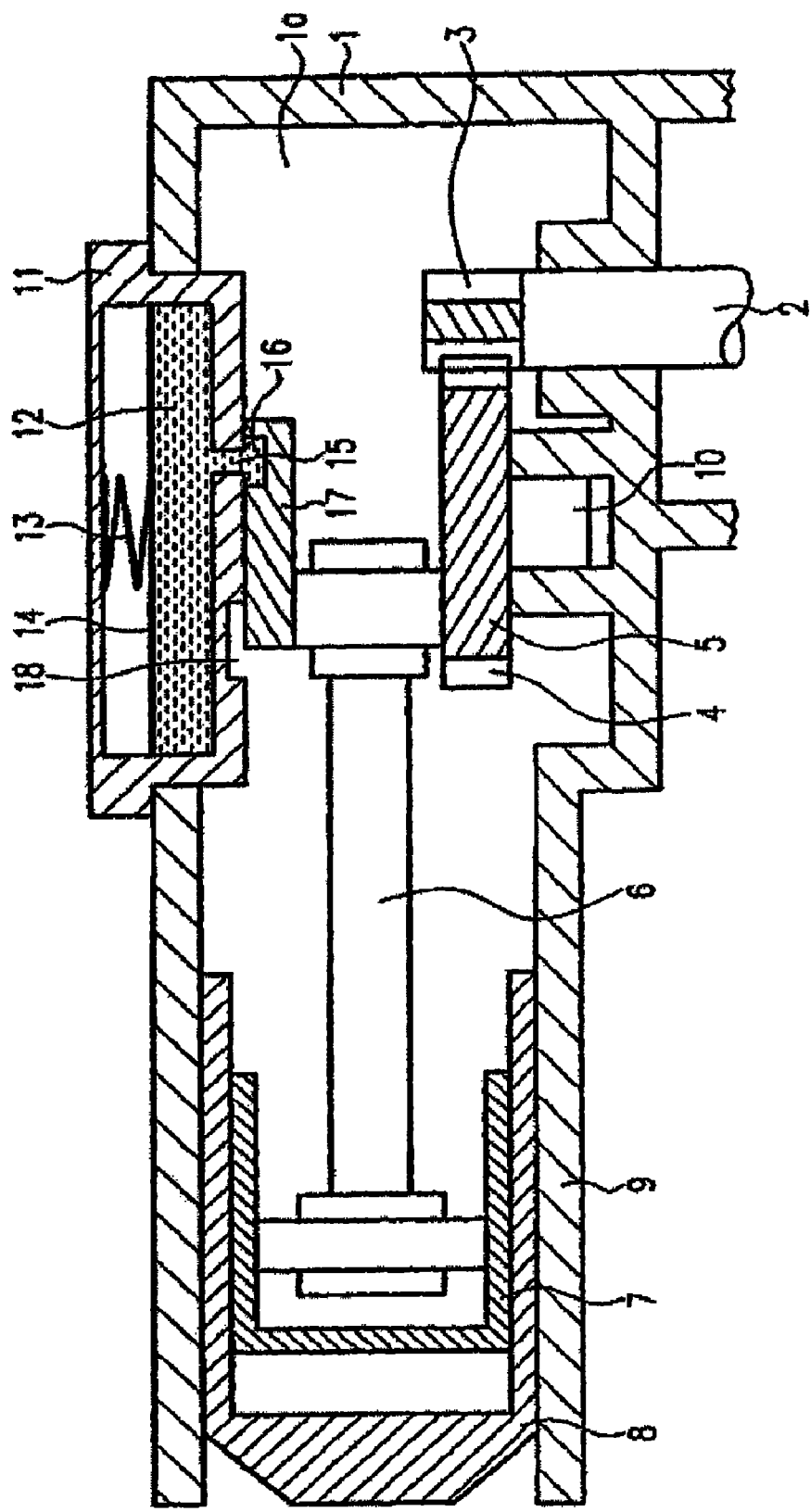
FIG. 1 shows a schematic section through a percussion mechanism and a lubricating device of a drilling and/or striking hammer according to the present invention.

FIG. 1 shows, in a schematic sectional representation, a first specific embodiment of the present invention, in the form of a known percussion mechanism in a drilling and/or striking hammer, designated a hammer below.

In a crank chamber 1*a* of a housing 1, a drive shaft 2 of a drive motor (not shown) is mounted, which shaft drives a toothed wheel 4 rotationally via a pinion gear 3. Toothed wheel 4 is a component of a crankshaft 5 that drives a connecting rod 6 back and forth.

At the other end of connecting rod 6, there is connected a drive piston 7 that can be moved axially back and forth in a hollow receptacle of a percussion piston 8. Percussion piston 8 is held in what is known as a percussion mechanism tube 9, which can be a component of housing 1, so as to be likewise capable of axial movement. During operation, percussion piston 8 strikes a shaft (not shown) of a machine, or an intermediately connected snap die.

The functioning of such a percussion mechanism has long been known and extensively described, so that further description is not necessary.

Crankshaft 5 is mounted on one side of housing 1 by means of a cog 10. On the opposite side, crankshaft 5 can likewise be mounted in a known manner with the aid of a cog (not shown). Alternatively, it is possible to provide, opposite cog 10, what is known as a "support boss," as known for example from DE 198 20 218 A1. An axial force acting on crankshaft 5 can thereby be supported, via a crown contour situated at the height of the axis of rotation of crankshaft 5, on an inner side of housing 1. The area of this support must be well lubricated (a point of lubrication).

In axial prolongation of crankshaft 5, a lubricant reservoir is provided that comprises, as a lubricant container, a lubricant receptacle 11, as well as a supply of lubricant 12 contained therein.

As a lubricant, high-viscosity grease is preferably used. Of course, it is however also possible to use low-viscosity grease-based lubricants or oil. However, grease is particularly well-suited due to its easier sealability.

In a variant not shown in FIG. 1, lubricant receptacle 11 can also be fastened to housing 1 of the hammer in exchangeable fashion as a cartridge. When lubricant supply 12 is used up, the operator merely has to exchange lubricant receptacle 11, replacing it with a new one.

Lubricant supply 12 inside lubricant receptacle 11 is placed permanently under pressure by a pressure-producing means. The pressure-producing means has a spring 13 and a piston 14 charged by the spring. Through the action of spring 13 and piston 14, lubricant 12 is permanently pressed against a dosing opening 15 formed in the floor of lubricant receptacle 11.

Dependent on a rotational position of crankshaft 5, dosing opening 15 corresponds with a recess 16, which acts as a ladle, fashioned in a disk of crankshaft 5. If recess 16 rotates further as a result of the rotational motion of crankshaft 5, dosing opening 15 is again closed by disk 17.

When recess 16 has rotated approximately 180°, it corresponds with a removal point 18 at which the lubricant is accelerated out of recess 16, and can move into the interior of housing 1, i.e., into crank chamber 1a or percussion mechanism tube 9.

The cross-section of dosing opening 15 can be formed dependent on the viscosity of the lubricant used. In the case of low-viscosity lubricants, it can also be useful to fasten an insert in dosing opening 15 in order to reduce the cross-sectional surface of dosing opening 15.

Particularly important points to be lubricated include on the one hand the bearing points of crankshaft 5 and the gear mechanism that rotates the crankshaft, made up of pinion gear 3 and toothed wheel 4, as well as, on the other hand, the actual percussion mechanism, made up of drive piston 7, percussion piston 8, and percussion mechanism tube 9. In the percussion mechanism in particular, due to the large power conversion and the friction connected therewith, very high temperatures can be reached which urgently require sufficient lubrication, thus placing high demands on adequate lubrication and on the lubricant.

Of course, the crankshaft can also be mounted and lubricated in another manner, as is shown in FIG. 1.

Instead of piston 14 and spring 13, a gas pressure spring or a gas supply under pressure can also be used that presses against a membrane that acts as a piston. Different possibilities for producing pressure in lubricant supply 12 are known to those skilled in the art, so that a detailed description is not necessary.

Figure 2:
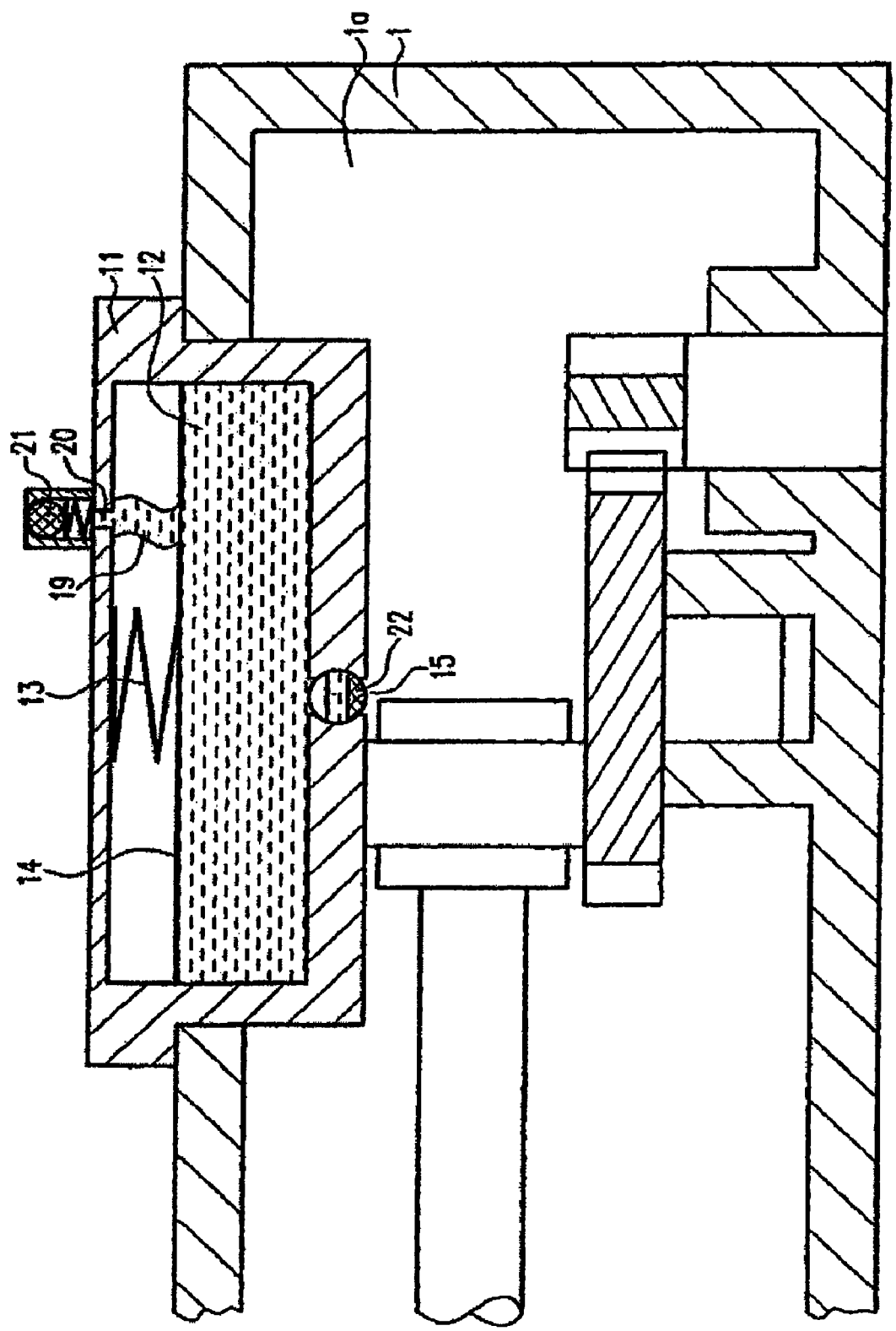
FIG. 2 shows an enlarged sectional representation of a second specific embodiment of the lubricating device of present invention.

FIG. 2 shows a second specific embodiment of the present invention, as a variant of FIG. 1. Because the drive system, made up of crankshaft, connecting rod, and percussion mechanism, is unchanged, and to this extent also does not relate to the subject matter of the present invention, a repeated description is omitted.

In lubricant receptacle 11 there is contained lubricant supply 12, which, as in FIG. 1, is placed under pressure by a spring 13 and a piston 14, shown only schematically.

Lubricant supply 12 is connected with a refill opening 20 via duct 19, and a grease fitting with a check valve 21 is situated before this refill opening. Via check valve 21 and refill opening 20, as well as duct 19, lubricant supply 12 can be refilled with lubricant. This can for example be accomplished using a grease gun, in a known manner.

A valve apparatus 22 is placed into dosing opening 15. Valve apparatus 22 shown in FIG. 2 is made up of a rotatable valve element through which a bore passes. According to the position of the valve element, dosing opening 15 is opened, so that lubricant can flow from lubricant supply 12 into crank chamber 1a in the interior of housing 1, or dosing opening 15 is closed.

A controlling of valve apparatus 22 takes place by means of a valve control device (not shown). There are many possible criteria for controlling valve apparatus 22. For example, the opening of dosing opening 15 by valve apparatus 22 can take place intermittently at predetermined time intervals whenever the hammer is in operation. This controlling is very simple, but has the disadvantage that the lubrication may not meet the needs of the actual situation.

For this reason, it is particularly advantageous if, with the aid of a stress acquisition device (not shown), an actual current or long-term stress on the hammer can be determined. A suitable criterion for the stress is, for example, the temperature inside the drilling hammer. Whenever the temperature reaches a particular value, the stress acquisition means recognizes that the hammer is in operation and is exposed to a corresponding stress. The temperature can preferably be acquired by a temperature sensor.

Another possibility is to use suitable sensors to determine the quantity of lubricant in the area of the point to be lubricated, i.e., here, at the bearing points of crankshaft 5, at the teeth, or in the percussion mechanism.

In addition, the (remaining) quantity of lubricant in the lubricant reservoir can be acquired in order to indicate to the operator in a timely fashion when lubricant supply 12 must be refilled, or lubricant receptacle 11 must be replaced by a new one.

Other criteria for the stress on the hammer include the time of operation (e.g., since the last maintenance), the total, i.e., accumulated, current or power consumption over the time of operation, or also the total number of rotations of the drive of the hammer. In particular in hammers having an electronically controlled drive, it is possible, without great expense, to acquire the power consumption or the drive frequency or rotational speed and to sum this over the time of operation. When predefined intermediate or boundary values have been reached, valve apparatus 22 can be actuated in order to open dosing opening 15.

In addition, it is possible to use the information obtained in this way for displaying a maintenance state of the hammer.

In the course of preliminary tests, it has been determined how many operating hours, motor rotations, etc., are possible for the hammer with one filling of lubricant receptacle 11, and, correspondingly, when it will be necessary either to refill lubricant supply 12 or to perform a larger maintenance operation on the hammer. The operator can be informed of this in a timely fashion using acoustic or optical signals. Thus, the operator is not required, as in the past, to monitor maintenance intervals himself and to adhere to a maintenance schedule. Rather, the monitoring function is integrated completely into the hammer according to the present invention. This can go as far as to include the feature that the stress acquisition means, or an evaluation means that evaluates a corresponding stress signal, switches off the drive motor of the hammer when the maintenance state of the hammer is such that there is a risk of permanent damage.

With the aid of the stress acquisition means and the evaluation means, supplied by the stress acquisition means with a corresponding stress signal, and with the aid of the display means, it is possible for the operator to be informed at all times as to whether it is necessary to refill lubricant, to exchange lubricant receptacle 11, which is fashioned as an exchangeable cartridge, or to perform a general maintenance operation on the hammer.

Figure 3:
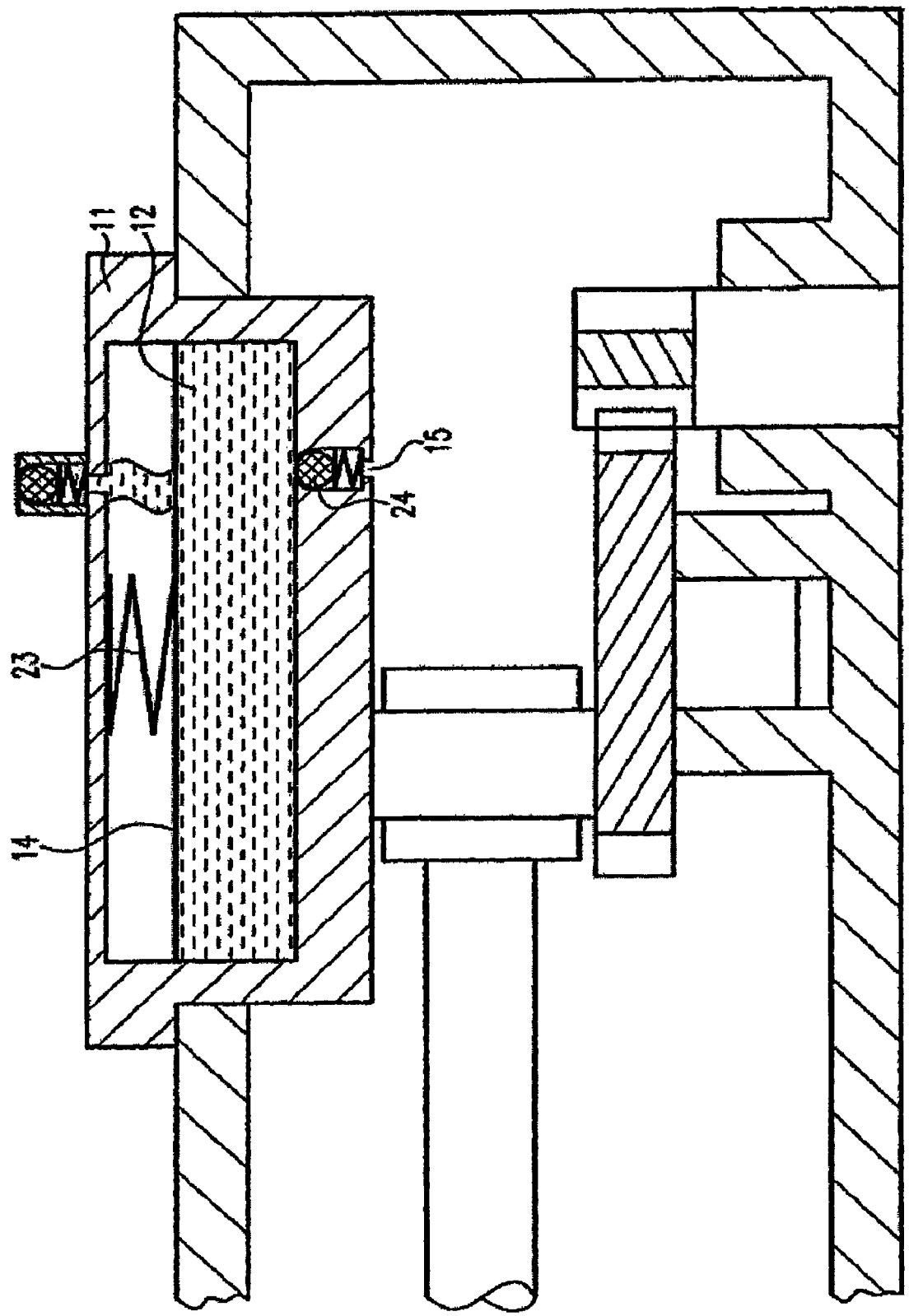
FIG. 3 shows an enlarged schematic sectional representation of a third specific embodiment of the lubricating device of the present invention.

FIG. 3 shows an additional specific embodiment of the present invention, in which, in place of spring 13, what is known as a memory spring 23 is used, which acts on piston 14, and thus on lubricant supply 12 inside lubricant receptacle 11.

The capacity for refilling lubricant supply 12 is realized in a manner similar to that in the second specific embodiment according to FIG. 2, so that a repeated description is unnecessary.

In dosing opening 15 there is placed a check valve 24 in order to prevent used or contaminated lubricant from flowing back into lubricant supply 12. Via check valve 24, it is thus possible only to bring fresh lubricant out of lubricant supply 12.

Memory spring 23 is made of a special, known steel, and has the property that it strives to return to its original shape, and in this way to exert a spring force on piston 14 and thus on lubricant supply 12, only when a predetermined temperature value has been exceeded. This fact is advantageously exploited in that the necessary spring force for pressing lubricant out of dosing opening 15 is not produced until a heating of the hammer, and thus of memory spring 23, has taken place during operation of the hammer.

This variant has the great advantage that further control devices and sensors are rendered superfluous, which additionally increases, in particular, the operational reliability of the hammer.

Figure 4:
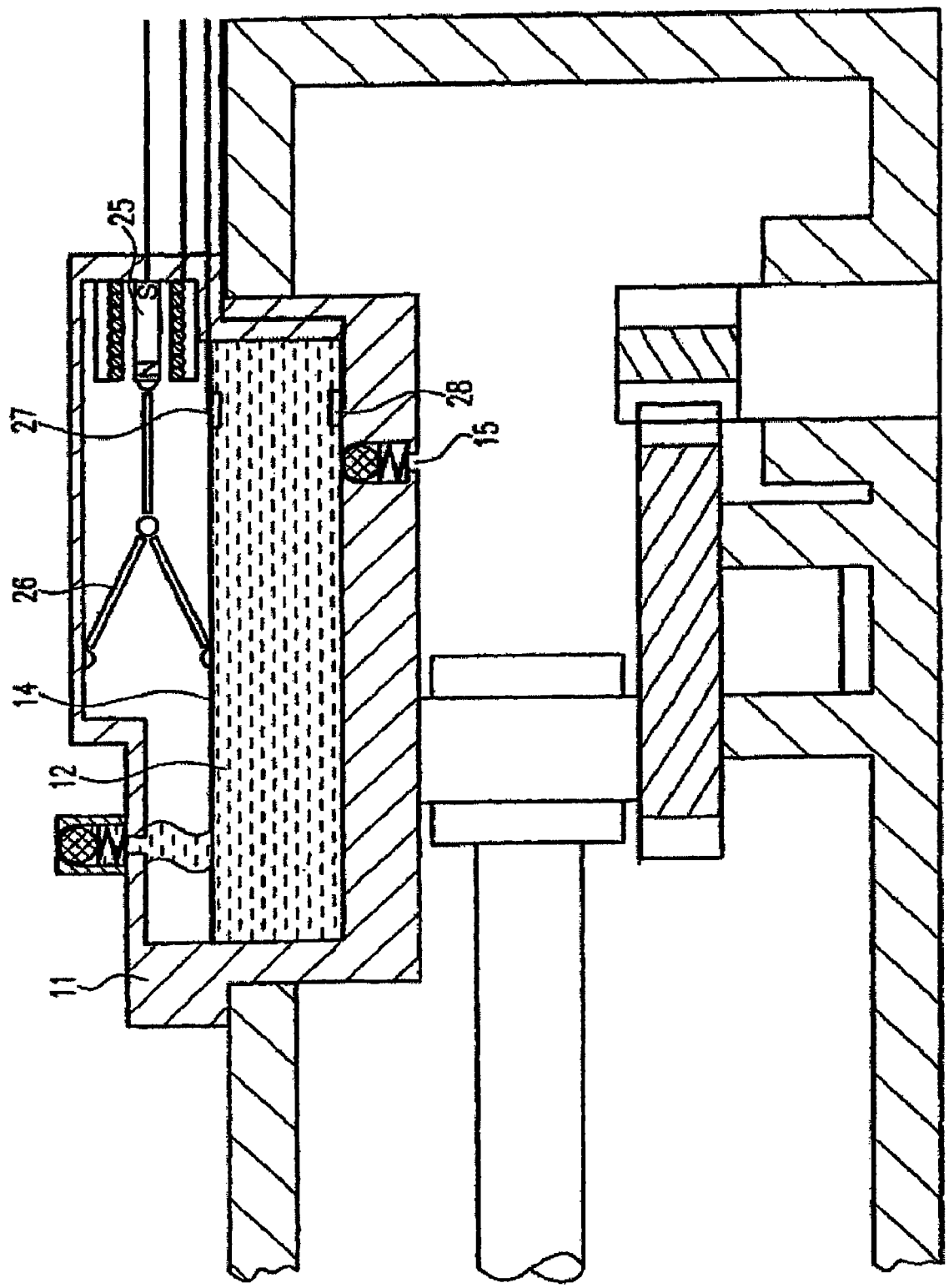
FIG. 4 shows an enlarged sectional representation of a fourth specific embodiment of the lubricating device of the present invention.

In FIG. 4, a fourth specific embodiment of the present invention is shown that, in contrast to FIG. 3, is characterized by a pressure-producing device that is particularly expensive but that can be set with a high degree of sensitivity.

Lubricant supply 12 in receptacle 11 is placed under pressure by an actuating element 25 and by a lever mechanism 26 that is charged by actuating element 25 and that acts against piston 14. It is hereby sufficient under certain circumstances to provide only a slight increase in pressure in lubricant supply 12 in order to achieve a continuous flow of lubricant through dosing opening 15.

Actuating element 25, which operates electromagnetically, can on the one hand be excited by a constant current in order to exert a largely constant force on piston 14, whereby lever mechanism 26 is to be constructively adapted thereto if necessary. Alternatively, it is also possible to set the force that can be produced by actuating element 25, and thus the pressure action on lubricant supply 12, dependent on the actual stress on the hammer. For this purpose, the signal from the stress acquisition means is correspondingly evaluated and is supplied to actuating element 25.

As already described, it is useful for the operator to be informed concerning the degree of filling of lubricant receptacle 11, in particular when lubricant receptacle 11 has been emptied. For this purpose, in the fourth exemplary embodiment a contact sensor is provided that has a first contact 27, situated on piston 14, and a second contact 28, provided on the floor of lubricant receptacle 11. When first contact 27 and second contact 28 come into contact with one another, a control current circuit is closed and a corresponding signal is produced that can inform the operator, via a display, that lubricant supply 12 has become empty.

Of course, many other means known to those skilled in the art can also be used for displaying the filling state.

Instead of the electromagnetic actuating element shown in FIG. 4, other types of actuating elements are also possible, such as for example actuating elements having motor-driven, electromechanical, or piezoelectric active elements. The task of the actuating element is only to charge piston 14 or a corresponding membrane with a force in such a way that lubricant supply 12 is placed under pressure.

Figure 5:
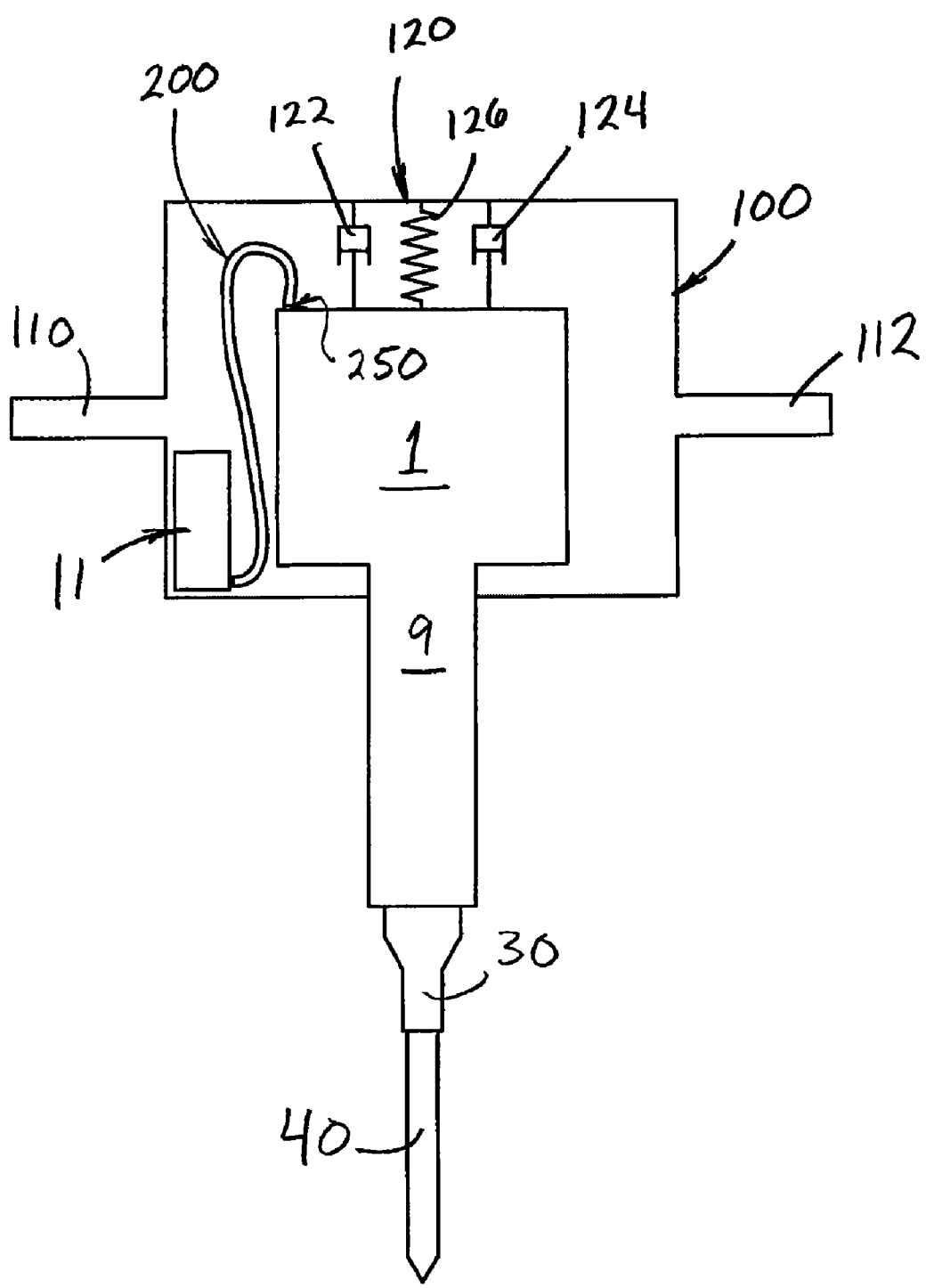
FIG. 5 shows a schematic partial section through a drilling and/or striking hammer according to the present invention.

FIG. 5 shows, as a schematic partially cross-sectional representation, an entire hammer incorporating another embodiment of the lubricating device. The hammer is shown as a complete assemblage 120, including a tool holder 30 attached to the bottom of the percussion mechanism tube 9 and holding a tool 40 therein. The tool 40 may be, for example, be a chisel or a drill. The hammer also includes a hood 100 that covers the housing 1. Handles 110, 112 extend transversely away from opposing side surfaces of the hood 100, in a known manner.

Also in a known manner, a vibration damping system 120 connects the hood and housing 1 to each other, while at least partially isolating the hood 100 from vibrations and impacts originating from the percussion mechanism (within tube 9) or its driving transmission (within housing 1). This can be accomplished by providing the vibration damping system 120 with, for example, a pair of guide rails 122, 124 and a spring 126 that extend between the hood 100 and housing 1.

Figure 6:
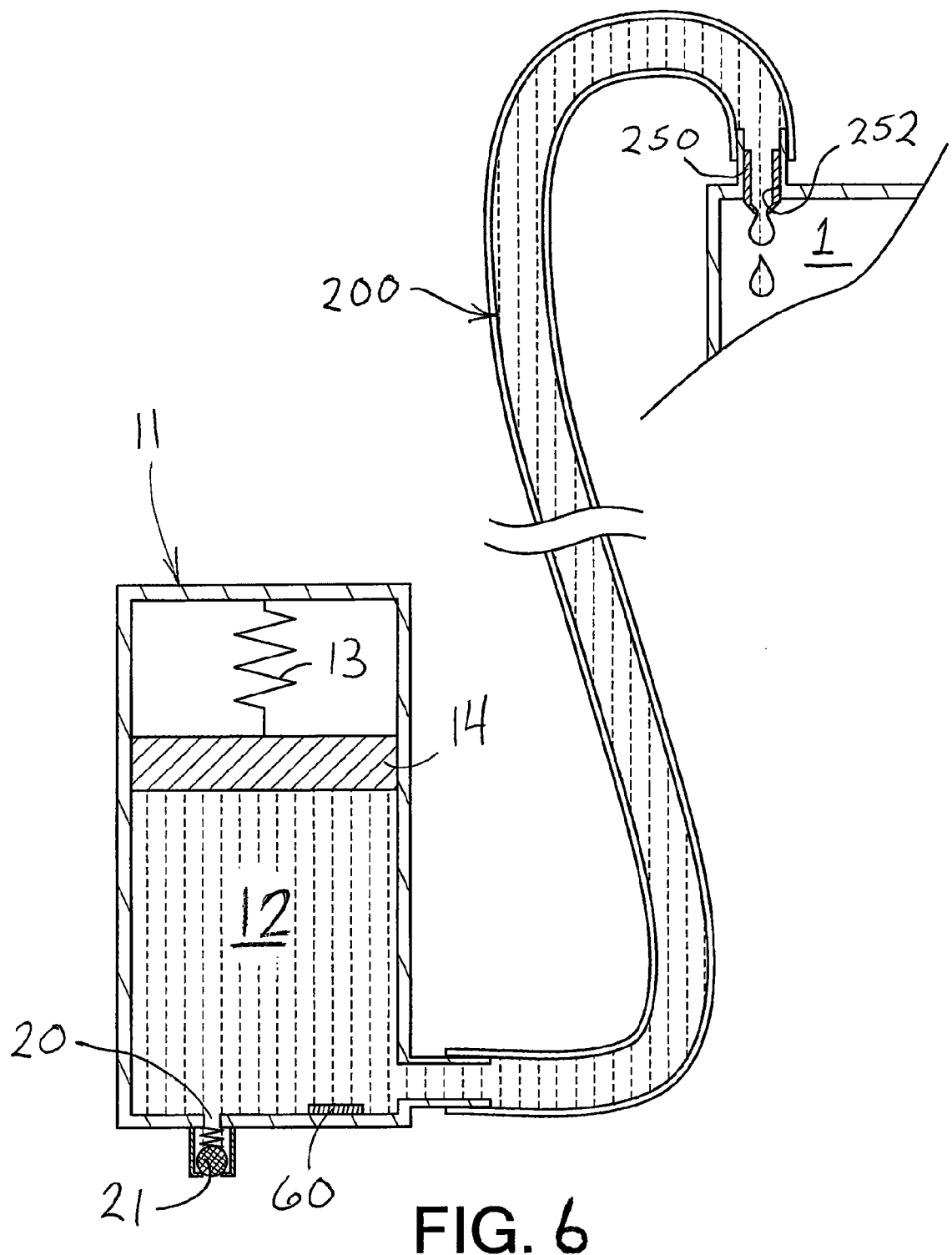
FIG. 6 shows an enlarged sectional representation of yet another embodiment of a lubricating device according to the present invention.

Referring now to FIGS. 5 and 6, the lubrication device of the illustrated embodiments is configured to automatically vary its dosing or lubricant flow rate as a function of tool stress, which can include use intensity and/or temperature. The lubrication device includes a reservoir or lubricant receptacles 11 located remotely from the lubrication target. Receptacle 11 preferably is mounted to the hood 100 while the lubrication target is a located within the housing 1, percussion system, and/or tool holder, with a flexible tube 200 extending therebetween. To simplify the discussion, the lubrication device is described in terms of a receptacle 11 located remotely from and connected to housing 1, noting that such discussion is equally applicable to receptacles 11 that are connected to other parts of the housing 1, percussion system, and/or tool holder.

Still referring to FIGS. 5 and 6, the receptacle 11 can be mounted inside of the hood 100, against an inner surface of the one of the bottom or sidewalls of the hood 100. For example, receptacle 11 may be a generally rectangular enclosure with a bottom wall that is attached to a bottom wall of hood 100. The receptacle 11 can stand upright along an inner surface of a sidewall of the hood 100, so that the receptacle 111 is spaced from the housing 1, percussion system, and tool holder, whereby the receptacle 11 is dampened or isolated from vibrations, shakes, and impacts originating from the percussion mechanism or its driving transmission.

Receptacle 11 is configured to house and deliver a volume of lubricant 12, which is preferable grease. The receptacle of this embodiment can hold more than 100 mm$^3$ of grease, and is nearly square in cross-section with sectional length and width dimensions of 50 mm×55 mm and with a total volume of 108 mm$^3$ of grease.

The grease can be a combination of different lubricating constituents, such as e.g. lithium soaps and oils. The lubricating constituents or additives of the grease have thixotropic or pseudoplastic properties. Correspondingly, the grease exhibits "shear-thinning" properties, whereby the viscosity of the grease drops in response to increases in temperature and/or the impact of shear stress or forces.

Still referring to FIGS. 5 and 6, receptacle 11 can be configured for refilling or replenishing with grease, by way of grease fitting that includes a check valve 21 like those seen in FIGS. 2 and 3 that allow one-way flow of grease through a refill opening 20. The grease fitting extends downwardly from a bottom wall of the receptacle 111 and can extend through a bottom wall of the hood 100. Unlike the grease fittings seen in FIGS. 2 and 3, the grease fittings of FIGS. 5 and 6 are positioned downstream of or below the spring 13 and piston 14, negating the need for a duct 19 to convey lubricant through the piston 14. Stated another way, spring 13 can apply a biasing force in a first direction and replacement grease can be conveyed through the check valve 21 in a second, opposite direction.

Still referring to FIGS. 5 and 6, spring 13 can perform a similar function as those described with respect to FIGS. 2 and 3 in that it pressurizes the lubricant in the reservoir to a pressure value that is greater than atmospheric pressure. It may, for example, be a pneumatic or other spring. Spring 13 can generate (i) a post-atmospheric pressure of greater than 8

PSI and preferably greater than 10 PSI, for example 10.1 PSI (0.7 bar), when the receptacle 11 is full of grease, and (ii) can generate or maintain a post-atmospheric pressure of greater than 2 PSI and preferably greater than 4 PSI, for example 4.4 PSI (0.3 bar), when the receptacle 11 is empty.

For pneumatic versions of spring 13, a pressurized gas can be held in a bellow or remote reservoir that is fluidly connected to a portion of the receptacle 11 that is across the piston 14 from or upstream of the grease. In other words the void space of receptacle 11 that is shown as being occupied by the schematically represented spring 13 can be directly pressurized with a gas or by a gas that is held in a remote reservoir. In some embodiments, the grease can be pneumatically pressurized during operation by a pumping device with a shaking plunger that is fluidly connected to the portion of the receptacle 11 that is across the piston 14 from or upstream of the grease. In any such pneumatic versions of spring 13, the gas pressure can be released automatically through a small nozzle after the tool operation is switched off.

Still referring to FIGS. 5 and 6, spring 13 and piston 14 cooperate with a sensor, preferably a proximity sensor 60, that determines the volume of grease that is in the receptacle 111 at a particular time. Proximity sensor 60 is mounted to a bottom wall of the receptacle 11 and senses how close the piston 14 is to the bottom wall of the receptacle 11 and therefore how much grease remains. The proximity sensor 60 can be connected to a light or other display device to indicate to the operator when a grease refilling procedure should be performed or, alternatively, to a device that switches of the hammer when a low grease volume condition is sensed or with a certain time lag after sensing such condition. Optical sensors, capacitance-based sensors, or other sensors could be used in place of proximity sensor and use to directly or indirectly monitor the level of grease in the receptacle 11 or to at least detect a low-lubricant condition in which the level of lubricant in the receptacle drops below a designed threshold.

Referring yet further to FIGS. 5 and 6, when a sufficient amount of grease is held within receptacle 11, the spring 13 and piston 14 push the grease out of the receptacle 11, through flexible tube 200 and to the lubrication target. The flexible tube 200 extends from a lower part of a sidewall of receptacle 111 to an upper wall of the housing 1. Since the tube 200 is connected to the receptacle 11 at one end and to the housing 1 at the other end, the flexible tube 200 bends or flexes while the hood 100 and housing 1 move with respect to each other as a result of vibrations and other movements of the housing 1, accommodating dynamic changes in a distance defined between the hood 100 and housing 1 during such occurrences. In this configuration, at least a portion of the flexible tube 200 vibrates in unison with the housing 1, while an end of the flexible tube 200 that is connected to the receptacle 11 remains substantially still or fixed with respect thereto. In other words, at least a portion of flexible tube 200 dynamically moves, shakes, or vibrates, in multiple directions, in a manner that corresponds to the movement of housing 1

Still referring to FIGS. 5 and 6, preferably the flexible tube 200 is longer than a distance, measured along a straight line, between the lubrication outlet of the receptacle 11 and lubrication inlet of the housing 1. Accordingly, the flexible tube 200 extends along a curvilinear path, having at least one bend or arc along its length. In the illustrated embodiment, the flexible tube 200 extends, at its lower portions, transversely and horizontally from the receptacle 11 and then bends upwardly and extends vertically up, generally parallel to the receptacle and housing 1. At its upper portion, the flexible tube 200 continues to extends vertically up from the lower portion and then bends 180 degrees, defining an upside-down U-shaped bend that connects to the upper wall of housing 1. The tube 200 as a whole thus is generally S shaped through most of its length.

Still referring to FIGS. 5 and 6, flexible tube 200 is preferably made from a polymeric or elastic material such as rubber. The dimensions of flexible tube 200 are selected to facilitate efficient transfer of forces from the flexible tube 200, while it moves or vibrates in unison with housing 1, to the grease within the flexible tube 200, establishing a stirring effect within the grease and subjecting it to sheering forces. The tube 200 preferably is greater than about 400 mm long and has an inner diameter (ID) of greater than 2 mm, for example about 500 mm long and having an ID of about 4 mm. This is considerably longer and wider than is strictly necessary to convey grease to the lubricated components.

Still referring to FIGS. 5 and 6, the outlet of the flexible hose 200 is connected to a nozzle 250 mounted in an opening 252 in the top wall of housing 1. Nozzle 250 can have a length of greater than 10 mm and an ID of less than 5 mm, for example a length of 24 mm and an ID of 3 mm.

In light of the above, when using the embodiments seen in FIGS. 5 and 6, the dosing quantity of grease flow is thus influenced primarily by two different factors, each of which contributes to a viscosity change. Those two factors are (i) movement, shaking, or vibration of the flexible tube 200, and (ii) temperature changes, of the flexible tube 200. Since the grease has thixotropic or pseudoplastic properties, it achieves a lower viscosity or becomes runnier and flows easier when the flexible tube 200 shakes and/or its temperature increases.

Stated another way, the lubricating device is subjected to two conditions or states, a resting state in which the grease does not flow into the housing 1 and an in-use state in which the grease freely flows into the housing 1. When the lubricating device is in the resting state when the hammer 120 is not operating, for example when the hammer is not in operation, the flow resistance value of the lubricating device, defined by the viscosity of the grease and friction between the grease and the tube 200, is greater than the driving pressure value, defined at least in part by the pressurization of the grease within the receptacle 11. Conversely, when the lubricating device is in an in-use state when the hammer 120 is operating, its flow resistance value is less than the driving pressure value, whereby grease is conveyed to the housing 1 at dosing or flow rate that depends on the prevailing tool stress in the form of use intensity and/or temperature.

A change of tool stress by changing the amount of movement, shake, or vibration of flexible tube 200 changes the magnitude of sheer stress imposed on the grease therein, effecting a corresponding change in lubricant viscosity and a resultant change dosage or flow rate. Changing use temperature likewise will change the temperature of the grease in the flexible tube 200 and also change the lubricant's viscosity and the dosage or flow rate. Accordingly, variations in environmental and use conditions are accommodated by automatic variations in the viscosity of the grease in the lubricating device and consequent automatic variations in lubricant dosing or flow rate varies in correspondence with hammer lubrication needs.

Typical variations in ambient temperatures in the intended end use environments range between −10° C. and 40° C. (14° F. and 104° F.). Temperatures within housing 1 can warm up around 40° C. to 50° C. above the environment during continuous operation. However, the temperature of flexible hose 200 tends to be cooler than the housing 1 during use. That is because the drive motor and electronics are cooled with a fan within the housing 1 or between the housing 1 and the hood 100. The fan emitted air, warmed up to about 20° C. to 30° C.

above the temperature of the surroundings, either cools or heats up the receptacle 11, accordingly. The grease receptacle 11 and the hose are therefore at least 20° C. cooler than the temperatures within housing 1, but are still sufficiently high to influence dosing or flow rate of the grease, at least in combination with sheer stresses imposed on the grease while the flexible tube 200 moves, shakes, or vibrates with the housing 1.

In practice, it has turned out that the lubrication is particularly effective if used or contaminated lubricant can be removed from the inside of the housing. For this purpose, in the hammer according to the present invention there is provided, in the area of a tool guide (not shown) or an insertion end for a tool shaft, an opening (though a small one) in the form of a gap or a purposeful leak, through which the lubricant can exit housing 1. In this way, to a certain extent a regeneration of the lubricant inside housing 1 is achieved.

From the above description, it can be seen that the present invention can be realized in numerous variants. Thus, on the one hand there are various possibilities for producing a pressure in lubricant supply 12, of which only a few have been explained above. The valve controlling, or the indication of the maintenance state, can also be realized in various ways. To this extent, the above description is to be understood merely as an explanation of some examples, and not as a limitation of the scope of the claimed invention.

The invention claimed is:

1. A handheld drilling and/or striking hammer, comprising:
    a tool holder;
    a percussion mechanism that acts on a tool that is held in the tool holder;
    a housing connected to and extending away from the percussion mechanism;
    a transmission that drives the percussion mechanism to reciprocate and that is at least partially enclosed by the housing;
    a hood that covers the housing, defining a void space therebetween;
    a vibration damping system extending between and connecting the hood and the housing, while permitting the hood and the housing to move with respect to each other,
    a lubricating device that lubricates at a portion of at least one of i) the percussion mechanism, ii) the transmission, and iii) the tool holder and that includes,
        a reservoir holding a volume of lubricant therein and being attached to the hood;
        a flexible tube extending between the reservoir and the housing and directing lubricant therebetween at a variable flow rate, the flexible tube being constructed and positioned so as to flex while the hood and housing move with respect to each other so as to impart shear forces in lubricant in the tube that reduce the lubricant's viscosity to automatically vary the lubricant flow rate from the reservoir to the housing as a function of tool stress.

2. The drilling and/or striking hammer as recited in claim 1, Wherein, use, at least a portion of the flexible tube vibrates in unison with the housing.

3. The drilling and/or striking hammer as recited in claim 2, wherein a first portion of the flexible tube that is adjacent the housing vibrates with a greater amplitude than a vibration amplitude of a second portion of the flexible tube that is adjacent the hood.

4. The drilling and/or striking hammer as recited in claim 1, wherein the flexible tube is non-linear.

5. The drilling and/or striking hammer as recited in claim 4, wherein a portion of the flexible tube nearest the housing defines a U-shaped bend.

6. The drilling and/or striking hammer as recited in claim 5, wherein a portion of the tube between the U-shaped bend and the reservoir is generally S-shaped.

7. The drilling and/or striking hammer as recited in claim 4, wherein the interior of the tube defines a convoluted flow path including first and second generally opposing directions.

8. The drilling and/or striking hammer as recited in claim 1, wherein the flexible tube is a rubber hose.

9. The drilling and/or striking hammer as recited in claim 1, the lubricating device further comprising a nozzle attached to and opening into the housing, wherein an end of the flexible tube that is furthest from the reservoir is attached to the nozzle.

10. The drilling and/or striking hammer as recited in claim 1, the reservoir further comprising a grease fitting that opens into the reservoir for filling or refilling the reservoir.

11. The drilling and/or striking hammer as recited in claim 1, the reservoir further comprising a spring that pressurizes the lubricant in the reservoir to a pressure value that is greater than atmospheric pressure.

12. The drilling and/or striking hammer as recited in claim 11, wherein the spring is one of a pneumatic spring and a compression spring.

13. The drilling and/or striking hammer as recited in claim 11, the reservoir further comprising (i) a piston that is pushed by the spring and against the lubricant, and (ii) a proximity sensor that detects a position of the piston within the reservoir.

14. The drilling and/or striking hammer as recited in claim 1, further comprising a sensor that at least indirectly detects a low-lubricant condition in the reservoir.

15. The drilling and/or striking hammer as recited in claim 1, wherein the lubricant comprises a grease.

16. The drilling and/or striking hammer as recited in claim 15, wherein the grease has at least one additive having at least one of a thixotropic property and a pseudoplastic property.

17. The drilling and/or striking hammer as recited in claim 1, wherein the housing, the reservoir, and the flexible tube are constructed and positioned such that, in a resting state of the drilling and/or striking hammer, a flow resistance value of the lubricating device is greater than the driving pressure value such that the lubricant is static within the lubricating device; and, in an in-use state of the drilling and/or striking hammer, the flow resistance value of the lubricating device is less than the driving pressure value such that the lubricant flows from the reservoir to the housing.

18. A handheld drilling and/or striking hammer, comprising:
    a tool holder;
    a percussion mechanism that acts on the tool;
    a housing connected to and extending away from the percussion mechanism;
    a transmission that drives the percussion mechanism to reciprocate and that is at least partially enclosed by the housing;
    a lubricating device that lubricates at least a portion of at least one of i) the percussion mechanism, ii) the transmission, and iii) the tool holder and that includes
        a reservoir holding a volume of lubricant therein;
        a flexible tube extending between the reservoir and the housing and directing lubricant therebetween at variable flow rate, wherein the flexible tube is constructed and positioned such that, during use of the drilling and/or striking hammer, at least a portion of the flexible tube moves to accommodate relative movements between the reservoir and the housing, and such that the movement of the flexible tube subjects lubricant in the flexible tube to shear forces that reduce the lubricant's viscosity to automatically vary the lubricant flow rate from the reservoir to the housing as a function of tool stress.

19. The handheld drilling and/or striking hammer of claim 18, further comprising
   a hood that covers the housing, defining a void space therebetween; and
   a vibration damping system extending between and connecting the hood and the housing, while permitting the hood and the housing to move with respect to each other, wherein the reservoir is attached to the hood.

20. A handheld drilling and/or striking hammer, comprising:
   a tool holder;
   a percussion mechanism that acts on the tool holder;
   a housing connected to and extending away from the percussion mechanism;
   a transmission that is enclosed by the housing and that drives the percussion mechanism;
   a lubricating device lubricating at least portions of least one of the percussion mechanism, the transmission, and the tool holder, and including a reservoir holding a volume of lubricant therein and being pressurized to a driving pressure value, the lubricating device being positioned and constructed so as to have a variable flow resistance value and to define
      (i) a resting state in which a flow resistance value of the lubricating device is greater than the driving pressure value such that the lubricant is static within the lubricating device; and
      (ii) an in-use state in which the flow resistance value of the lubricating device is less than the driving pressure value such that the lubricant flows from the reservoir to the at least one of the percussion mechanism and a gear mechanism, and
   wherein the lubricating device dynamically changes from the resting state to the in-use state when the handheld drilling and/or striking hammer is activated.

21. The drilling and/or striking hammer as recited in claim 20, the lubricating device further comprising a flexible tube extending between and connecting the reservoir and the housing, such that when the lubricating device is in the in-use state, at least a portion of the flexible tube vibrates in unison with the housing and moves a volume of lubricant within the tube so as to reduce viscosity of the volume of the lubricant contained within the flexible tube and correspondingly decreases the flow resistance value of the lubricating device.

22. The drilling and/or striking hammer as recited in claim 21, wherein, when the lubricating device is in the in-use state, a temperature within the housing increases so that at least a portion of the flexible tube increases in temperature and reduces viscosity of a volume of the lubricant contained therein and correspondingly decreases the flow resistance value of the lubricating device.

23. A method of lubricating a handheld drilling and/or striking hammer, comprising:
   pressurizing a volume of lubricant being held in a reservoir of a lubricating device of a handheld drilling and/or striking hammer to a driving pressure value;
   delivering the lubricant through a flexible tube that extends between the reservoir and at least one of the percussion mechanism and a gear mechanism;
   varying a delivery rate of the lubricant as a function of tool stress by changing a flow resistance value within the lubricating device by subjecting lubricant within the flexible tube to shear forces from movement of the flexible tube, so that:
      (i) in a resting state, the flow resistance value of the lubricating device is greater than the driving pressure value such that the lubricant is static within the lubricating device;
      (ii) in an in-use state, the movement of the flexible tube subjects the lubricant to shear forces that lower the lubricant's viscosity so that the flow resistance value of the lubricating device is less than the driving pressure value such that the lubricant flows from the reservoir to the at least one of the percussion mechanism and the gear mechanism.

24. The method of claim 23, wherein changes in tool stress change the amount of movement of the flexible tube and correspondingly change the delivery rate of the lubricant.

* * * * *